(12) United States Patent
Cook

(10) Patent No.: US 11,359,763 B2
(45) Date of Patent: Jun. 14, 2022

(54) LOCKING LATCH AND MOUNT FOR SECURE ATTACHMENT AND SUPPORT OF ENCLOSURES

(71) Applicant: Charter Communications Operating, LLC, St. Louis, MO (US)

(72) Inventor: Charles Cook, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 50 days.

(21) Appl. No.: 16/917,559

(22) Filed: Jun. 30, 2020

(65) Prior Publication Data

US 2021/0404599 A1 Dec. 30, 2021

(51) Int. Cl.
*F16M 13/02* (2006.01)
*E05B 35/00* (2006.01)
*E05B 65/52* (2006.01)

(52) U.S. Cl.
CPC ........... *F16M 13/02* (2013.01); *E05B 35/008* (2013.01); *E05B 65/52* (2013.01); *F16M 2200/02* (2013.01); *F16M 2200/08* (2013.01)

(58) Field of Classification Search
CPC .. B60P 7/0807; E05B 35/008; F16M 2200/02
USPC ............... 248/213.2, 221.12, 222.11, 222.41
See application file for complete search history.

(56) References Cited

U.S. PATENT DOCUMENTS

| | | | | |
|---|---|---|---|---|
| 1,571,762 A * | 2/1926 | Driscoll | ................... | A24F 19/00 131/241 |
| 2,966,107 A * | 12/1960 | Sanderson | ........... | F16M 11/041 248/187.1 |
| 4,470,716 A * | 9/1984 | Welch | ..................... | F16B 12/38 403/254 |
| 4,786,119 A * | 11/1988 | Smuda | ................... | A47B 17/00 108/159.11 |
| 4,973,023 A * | 11/1990 | O'Neill | ............... | E05B 73/0082 248/551 |
| 5,178,555 A * | 1/1993 | Kilpatrick | ............ | H01R 25/164 248/222.41 |
| 5,653,349 A * | 8/1997 | Dana | ....................... | F16B 12/34 211/189 |
| 5,971,683 A * | 10/1999 | Hunt | ..................... | B60P 7/0807 410/106 |
| 7,669,443 B2 * | 3/2010 | Varner | ..................... | F16B 35/06 70/58 |

(Continued)

*Primary Examiner* — Bradley Duckworth
(74) *Attorney, Agent, or Firm* — Straub & Straub; Michael P. Straub; Stephen T. Straub

(57) ABSTRACT

Methods and apparatus for securely mounting an enclosure are described. In various embodiments a device enclosure includes a recessed back area in which a mounting latch including a generally key-shaped opening is positioned. A mounting bracket including a post having multiple dimensions is secured to a wall. The enclosure and latch is placed over the post. The enclosure is moved so that the post slides in the key-shaped opening and snaps into the first portion of the key-shaped opening. To release the latch a release tool is inserted into a slot or other opening and rotated so that the tip or tips of the release tool can pass through one or more openings in a rear wall of the enclosure and compress a portion of the latch allowing the enclosure and latch to slide on the shaft until the enclosure reaches a position where it can be removed.

15 Claims, 12 Drawing Sheets

(56) References Cited

U.S. PATENT DOCUMENTS

| | | | |
|---|---|---|---|
| 8,602,372 B2* | 12/2013 | Yu ........................ | H05K 7/1489 |
| | | | 248/224.8 |
| 8,613,414 B2* | 12/2013 | Rosemann ............ | F16B 21/073 |
| | | | 248/222.11 |
| 8,720,761 B2* | 5/2014 | Binder ...................... | B60R 9/04 |
| | | | 224/557 |
| 2011/0073738 A1* | 3/2011 | Takao .................... | F16M 11/22 |
| | | | 248/397 |
| 2014/0374564 A1* | 12/2014 | Schroeder ............. | B60P 7/0815 |
| | | | 248/503 |

\* cited by examiner

LOCKING LATCH AND MOUNT FOR SECURE ATTACHMENT AND SUPPORT OF ENCLOSURES

FIELD

The present invention relates to enclosure mounting and fastening apparatus, and more particularly, to methods and apparatus for implementing a locking latch and mount, e.g., bracket, which can be used to securely attach an enclosure to a surface and/or support the enclosure.

BACKGROUND

Equipment enclosures are often used for housing communications equipment, alarm system components and/or other devices. In many cases the enclosures are directly screwed into a wall. In such cases the enclosure often needs to be held in position while the screws are used to secure the enclosure. In cases where the equipment being installed is small and light, such a mounting approach may be satisfactory for small pieces of equipment but for larger devices it can be hard for a single person to hold the device to be mounted in place while also screwing in the screws used to mount the device to a wall.

Another approach to mounting devices is to use slots with circular holes at the end in an enclosure. In such a case screws with large heads, e.g., pan head screws, are inserted into a wall but not fully tightened leaving a gap between the screw head and wall. The enclosure in such cases is placed over the screw heads with the screw heads extending through the circular holes. The enclosure is then lowered so that the shaft of the screws extends through a slot of the enclosure with the screw head keeping the enclosure in the slot with the enclosure effectively hanging from the screw heads. It should be appreciated that some enclosures can be attached to walls in either a horizontal or vertical orientation. In such a case the simple approach of screw heads extending through a hole that is connected to slot may not be sufficient because the implementation depends on gravity to hold the enclosure in place.

To remove an enclosure mounted in such a manner, a user need simply raise the enclosure so that the screw heads align with the portion of the holes in the enclosure and pull the enclosure away from the wall.

In both the case of screwing the device directly to the wall or hanging the device on screws which have not been fully screwed into the wall the enclosure can be easily removed using readily available tools or without any tools at all. In many cases where it is desirable to limit control over an enclosure to technicians who are responsible for installing and maintaining equipment, such easy access and removal can be of concern since anyone with a simple screwdriver can remove an installed device.

In many cases it is desirable to limit an average person's ability to remove equipment from a wall. This can be particularly important where the installed equipment is a device which is not owned by the individual at the customer premises where the device is installed. This is commonly the case with devices such as cable modems, fiber optic termination devices, alarm systems and/or other equipment which is leased or provided as part of a subscription service.

From the above it should be appreciated that there is a need for new and improved methods and apparatus for mounting devices to surfaces such as walls. It would be desirable if at least some of the methods and/or apparatus allowed a device to be mounted on a wall without a technician having to hold the device and at the same time drive screws to secure the device to the wall. It would also be desirable if a latch/mounting device could be developed which would allow a device to be mounted and/or a mounting post to be mounted in any of multiple orientations, vertically, horizontally and/or even upside down. It would also be desirable if in some embodiments a mounted device does not tilt to the right or the left if mounted using a single latched.

In addition it would be desirable if the device could be mounted without special tools. While being able to mount a device without the need for special tools is desirable, it would be desirable if, once mounted, the device was not easily removable with the use of a simple screwdriver or by simply lifting the device and pulling it from the wall. In particular, in at least some applications it would be desirable if a simple inexpensive tool was required to remove a device from a wall after it was mounted on the wall.

SUMMARY

Various features relate to methods and apparatus for securely mounting an enclosure are described. In various embodiments a device enclosure includes a recessed back area in which a mounting latch is positioned. In at least some embodiments the mounting latch includes a generally key-shaped opening. A mounting bracket including a post having multiple dimensions is secured to a wall. The front of the post includes a flange which extends beyond the sides of the post and can be used to secure the latch and enclosure so that it is prevented from pulling away from the wall and off the post once the enclosure is mounted on the bracket including the post.

During installation the enclosure including the latch is placed over the post. The post of the mounting bracket extends through the keyhole-shaped opening in the latch which may be, and in some embodiments is, made of sheet metal. The enclosure is moved so that the post slides in the key-shaped opening and snaps into the upper, e.g., first, portion of the key shaped opening. To release the latch a release tool is inserted into a slot or other opening in the front of the enclosure. Once extended into the slot in the front of the enclosure the latch release tool is rotated so that the tip or tips of the release tool can pass through one or more openings in a rear wall of the enclosure and compress a portion of the latch. By pressing on the latch and forcing a portion of the latch to move back towards the wall on which the enclosure is mounted, the opening in the latch is positioned closer to the wall where the shaft is narrower than at the outer portion of the shaft. By moving a portion of the latch to be positioned around a narrow portion of the post, the enclosure and latch can be slid with the shaft of the post reaching a position in a lower, e.g., second, area of the keyhole-shaped opening where the enclosure and latch can be pulled forward without catching on the front portion of the bracket post. This allows the enclosure assembly in which the mounting latch is located to be easily removed from the wall.

The mounting bracket can be, and sometimes is, secured to a wall using bolts. During installation the enclosure including the mounting latch can be placed over the post with the post of the mounting bracket extending into the enclosure and through the lower opening of the generally keyhole-shaped slot or opening in the mounting latch.

Once the enclosure in which the latch is mounted is positioned over the post of the mounting bracket, it is raised so that the post slides in the slot and snaps into an upper opening of the generally keyhole-shaped slot. Flat surfaces which define a portion of the upper opening in the latch support and hold the latch and enclosure securely against the wall to which the bracket is secured while the post remains in the upper hole of the keyhole shaped slot.

As previously discussed to release the latch a latch release tool is inserted through one or more openings in the enclosure and the tip or tips of the latch release tool compress a portion of the latch. Pressing on the latch forcing an upper portion of the latch back towards the wall aligns a narrower part of the bracket shaft with the mounting latch opening allowing the shaft to slide through an opening corresponding to the location where the upper and lower latch openings meet. This allows the enclosure to slide over the shaft to a point where it can be lifted off the shaft.

By including a slit opening in the front wall of the enclosure in combination with an offset slit opening in the rear wall of the enclosure or multiple holes in the enclosure, use of a flat straight screwdriver as a release tool can be prevented in at least some embodiments.

The combination of bracket, latch, enclosure and release tool can provide an enclosure and mounting system which can be easily installed without the need for special tools. However it can have the advantage of being difficult to remove without the use of a simple and inexpensive removal tool which, while being available to an technician, is likely to be difficult to obtain or unavailable to an ordinary customer.

While sliding the enclosure and latch up and down is discussed in various exemplary embodiments it should be appreciated that up or down is used to explain the invention in the context of a wall implementation where an enclosure is to be mounted vertically. Horizontal mounting of an enclosure is also supported in which case the latch and post are oriented horizontally, rather than vertically, and the movement of the enclosure would be left and right as the enclosure and latch are moved to transition between locked and released positions. Thus it should be appreciated that while explained in the context of a vertical mounting arrangement the mounting arrangement of the invention can be used to mount an enclosure in any orientation since a positive spring action and/or force is applied to the head of the post when the latch is in the locked position allowing for the latch to be locked whether it is vertically or horizontally mounted in an enclosure. The positive spring force occurs because when flexed the latch pulls the device being mounted tight against the wall to minimize or eliminate tilting of the device.

In some embodiments a pin is included below the post that passes into a slot of the latch. The pin which is secured to the same bracket that is used to mount the latch post to the wall is used in some embodiments to prevent rotation of the latch. The pin engages, e.g., slides in, a slot in the latch to prevent the device being mounted, e.g., enclosure, from rotating once the device is mounted. The use of a pin is optional and not used in all embodiments. In some other embodiments multiple latches are spaced parallel to each other on an enclosure and multiple posts are secured to a wall with the same spacing allowing multiple posts and latches to be at the same time. While multiple posts and/or a pin can be, and sometimes are, used in many embodiments a single latch without a pin is used in some embodiments and the force of the spring action is sufficient in many such embodiments to keep the device, e.g., enclosure, from rotating when the latch is in the locked position.

Numerous additional features and embodiments are discussed in the detailed description which follows. Numerous additional benefits will be discussed in the detailed description which follows.

DETAILED DESCRIPTION

Figure 1:
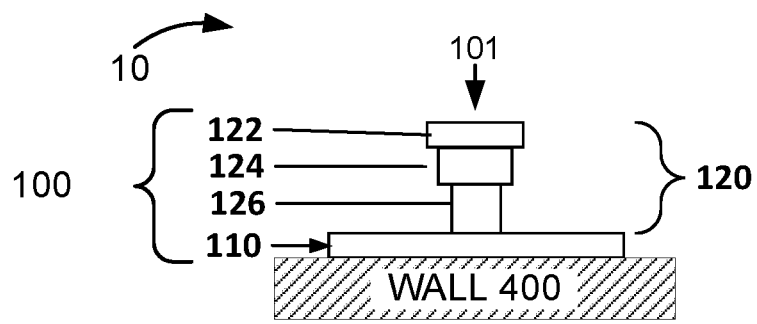
FIG. 1 is a drawing of a mounting bracket implemented in accordance with the invention secured to a wall as viewed looking up from below the bracket.

FIG. 1 is a drawing 10 of a mounting bracket 100 implemented in accordance with the invention secured to a wall 400 as viewed looking up from below the bracket. The bracket 100 is made of any rigid material, e.g., metal or another rigid material, that has sufficient strength to hold an object of interest. The bracket 100 includes a base 110 (also sometimes referred to as a support plate) and a shaft 101 (also sometimes referred to as post 120). The post 101 is formed integral to the base 110 or secured to the base 110 by a fastener such as a bolt or screw extending through the rear of the base/plate 110. While not visible in FIG. 1, the plate 110 includes holes 103, 105 which are visible in FIG. 3 and through which screws 103, 105 can be inserted to secure the bracket 100 to the wall 400.

Figure 3:
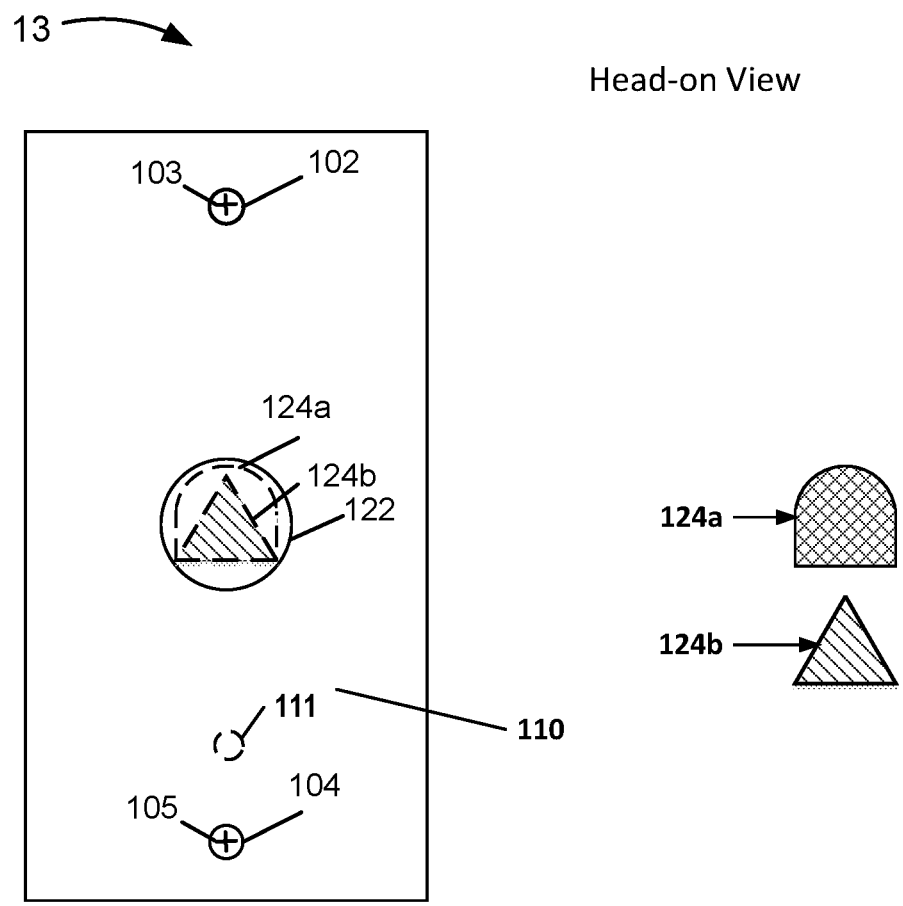
FIG. 3 is a head on view of the mounting bracket shown in FIGS. 1 and 2 as viewed from a position facing the wall along with an enlarged view of the profile of two different portions of the post which forms part of the mounting bracket.

The shaft 101, also referred to as a post, includes the set 120 of sections 122, 124, 126 which act as movement control portions. The different sections 122, 124, 126 have different cross-sections. Movement control portion 124 may have a variety of different shapes depending on the embodiment with element 124a and 124b of FIG. 3 showing different exemplary shapes which may be and sometimes are used as movement control portion 124. Movement control portion 124 is shaped so that when the latch 200 is moved, it moves easily in one direction, but not in another direction with the direction of easy movement being dependent on the position of the post within a latch opening 422 (see FIGS. 4 and 5) and/or whether the mounting latch 200 is compressed by a release tool or not. In some embodiments movement control portion 124 has a flat bottom surface and a rounded upper surface or pointed upper surface. Element 124a shows an example with a rounded upper surface and a flat lower surface while element 124b shows an example where a pointed triangular shape is used for element 124. In some embodiments the latch opening 422 is widest at a location identified by reference number 422M which is part of the lower opening 424 of the keyhole shaped opening 422 (see FIGS. 4 and 5). The widest part 422M is wide enough for flange 122 to be easily inserted into it. In various embodiments the maximum width of the upper opening 420 is less than that of the lower opening 424 and less than the diameter of the flange 122 used to secure the latch 200 and hold an enclosure 300 against the wall (See side view FIG. 8). Accordingly while in FIGS. 4 and 5 the maximum width of the upper opening 420 and lower opening 424 may appear the same or similar it should be appreciated that the maximum width of upper opening 420 is in fact less than the maximum width of the lower opening 424 and in many embodiments less than the diameter of the flange 122.

The shaft 101 has a head 122 in the form of a flange, a middle section 124 and a bottom section 126. The head 122 is the widest part of the post 101 but is small enough to fit into the top half of the latch keyhole 210. The middle portion 124 is the shaped portion of the post. Portion 124 has a flat bottom portion which rests on left and right flat surfaces 431, 431 of the latch 200 when slid into a top hole 420 of the generally keyhole shaped elongated opening of the latch 200 shown in FIG. 4 and FIG. 5 and the other figures. Portion 124 is shaped to allow it to move freely in one direction, e.g., upward, but not in the other when it is in the latch opening 424 and to remain in the top half 420 (see FIG. 5) of the latch keyhole 210 until the latch is depressed using a release tool as will be discussed below. The boundary, corresponding to reference number 425 shown in FIG. 5, between the top half of the keyhole 210 and the lower half of the keyhole 220 creates a barrier to the shape of the middle portion 124 of the post 120. The portion 126 of the shaft/post 101 is narrower than portions 122 and 124 so that it can freely pass through gap at the interface 425 between the top portion 420 of the keyhole opening 210 and the lower portion 424 of the keyhole 220. The portion 126 of the shaft 101 can be, and sometimes is, round in shape resulting a circular cross section sometimes having a diameter approximately the length of the gap between sections 431 and 432 of the latch. In some cases the diameter of the shaft portion 126 is slightly larger or smaller than the distance of the horizontal gap between surfaces 431 and 432 shown in FIG. 5 at location 425. In the case where the shaft portion 126 closest the plate 110 is slightly larger than the gap between sections 431 and 432 the left and right latch surfaces 252, 254 can flex allowing the gap to slightly increase as the shaft is moved through the gap. In some cases where the latch 200 and enclosure 300 are slid the pointed or curved shape of the top portion of section 124 helps spread the gap between sections 431 and 432 allowing the enclosure and latch 200 to be slid and snapped into position with the shaft 101 being secured in the upper opening 420 where it will remain until the latch 200 is depressed using a release tool such as one of the tools shown in FIG. 10.

Figure 2:
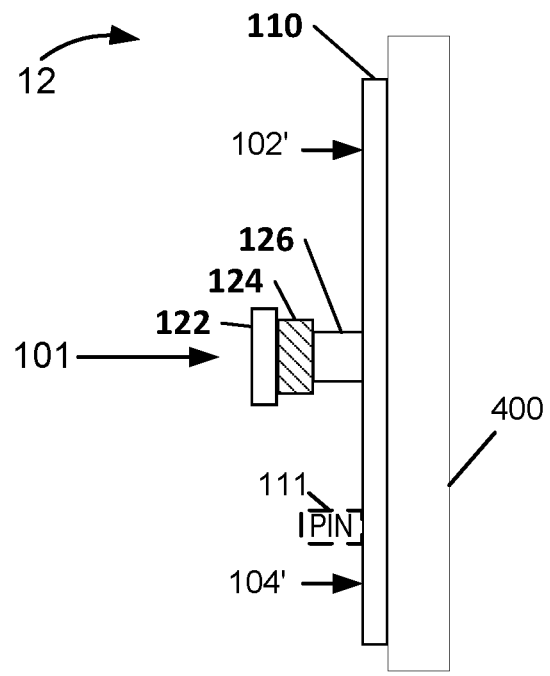
FIG. 2 is a side profile of the wall and mounting bracket arrangement shown in FIG. 1 with the mounting bracket extending out from the wall to which it is secured.

The various portions of the bracket 100 discussed with regard to FIG. 1 can be seen in the side view shown in FIG. 2. FIG. 2 shows a side profile 12 of the wall 400 and mounting bracket arrangement 100 shown in FIG. 1 with the post 101 of the mounting bracket 100 extending out from the wall 400 to which it is secured. In FIG. 2, reference numbers 102' and 104' are used to show the location of holes which are not visible in the side view. Element 111 is an optional pin that is used in some but not necessarily all embodiments.

The mounting bracket 100 can be better understood when the head on view 13 shown in FIG. 3 is taken into consideration along with the exemplary cross-sectional profiles of portion 124 of the shaft shown in FIG. 3. Since the head, e.g., flange portion 122, of shaft 101 is equal to or larger in maximum cross-sectional width than portion 124a or 124b, portions 124a or portion 124b would not be visible from the head on view and are thus shown using dashed lines. Since portions 124a and 124b are alternatives, only one would be used as element 124 in a given embodiment. The cross sections of 124A and 124b are shown to help the understanding of the arrangement of the different portions of the shaft 101. In FIG. 3 the screws 103 and 105 inserted into holes 102 and 105 are visible. These screws 103 and 105 are normally used to secure the bracket 100 to a wall prior to placement of an enclosure and latch assembly over the post 101. The screws 103, 105 extend through plate 110 and into the wall 400.

Figure 4:
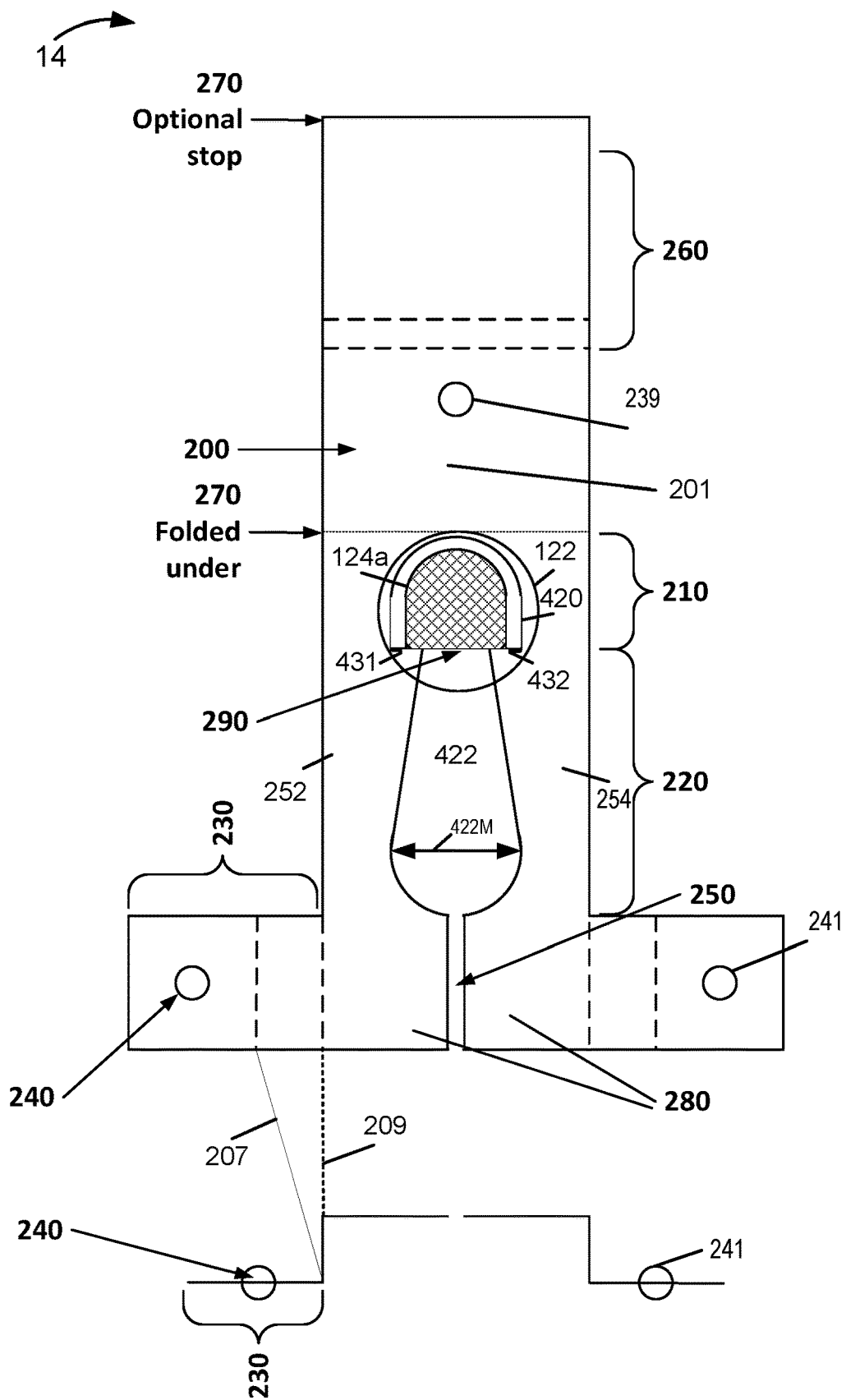
FIG. 4 shows a latch assembly which can be folded to form a spring latch plate that can be, and sometimes is, secured inside a rear portion of a device enclosure and which can be used to secure a device in which the latch is installed to the bracket shown in FIGS. 1-3.

FIG. 4 shows a head on view of a latch assembly 14 in the form of a stamped metal plate which can, and sometimes is, folded to form a spring latch plate that is used in some embodiments as the mounting latch 200 shown in the other figures. Shaft portions 122, 124 shown in FIG. 4 are not part of the latch plate but are shown to help in understanding of the size of various portions of the latch plate shown in FIG. 4. Once folded into shape along the dashed lines to form the mounting latch 200 the latch is inserted into a recessed portion 310 of an enclosure so that the latch can be used to secure the enclosure to a wall 400. The various numbered components shown in FIG. 4 will be discussed in further detail below.

Figure 5:
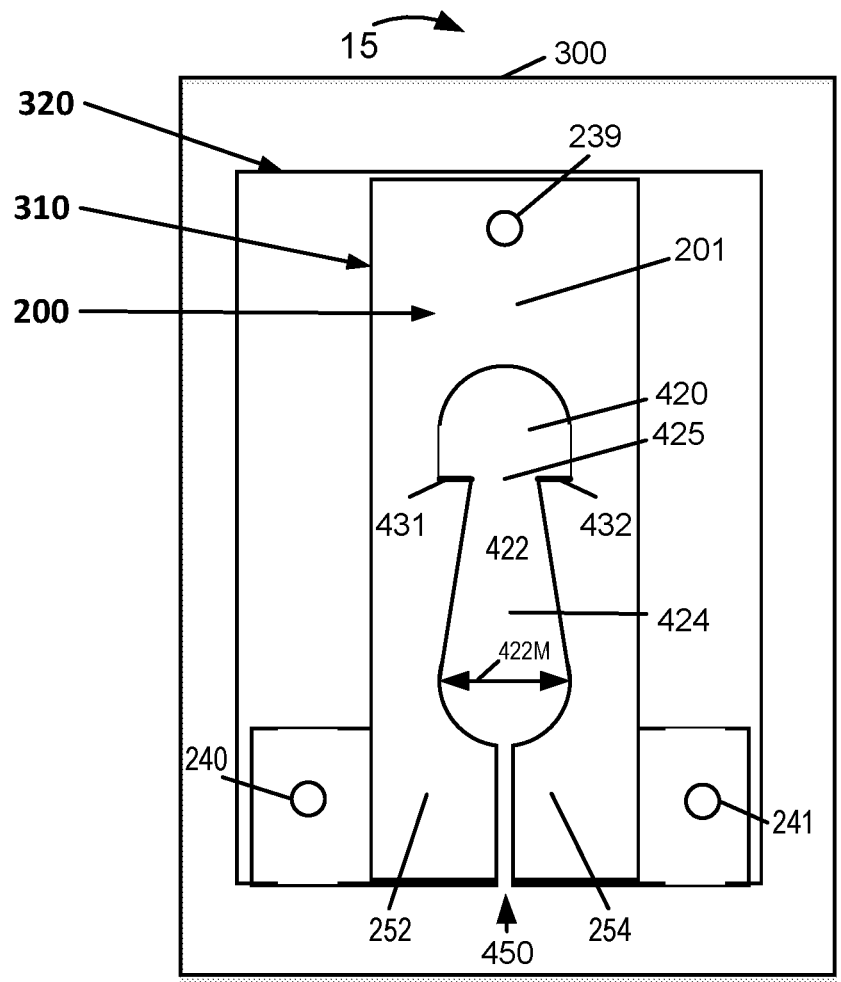
FIG. 5 shows the latch assembly of FIG. 4 when fold into shape and installed in a recess formed in the back of a device enclosure.

FIG. 5 shows the latch assembly of FIG. 4 when fold into shape and installed in a recessed area 310 formed in the back 320 of a device enclosure 300. The latch 200 (folded on dashed lines shown in FIG. 4) is mounted in the recessed area 310 and secured using screws or other fasters inserted in holes 239, 240 and 241. In FIG. 5 the elongated opening 422 which is generally keyhole shaped is visible along with upper opening 420 and lower opening 424. A slit 450, also sometimes referred to as a slot, separates left side latch portion 252 from right side latch portion 254 allowing some movement of the latch portions when the shaft 101 is moved from the position of the lower opening 424 to the position of the upper opening 420 or vise versa. A release tool can be used to apply pressure to the front side of upper portion 201 of the latch causing the latch to move closer to a wall when the enclosure and latch assembly 15 shown in FIG. 5 is secured to a wall thereby moving surfaces 431 and 432 to a position corresponding to the narrow part 126 of the shaft 101 and allowing the enclosure and latch to slide down and be removed.

Figure 6:
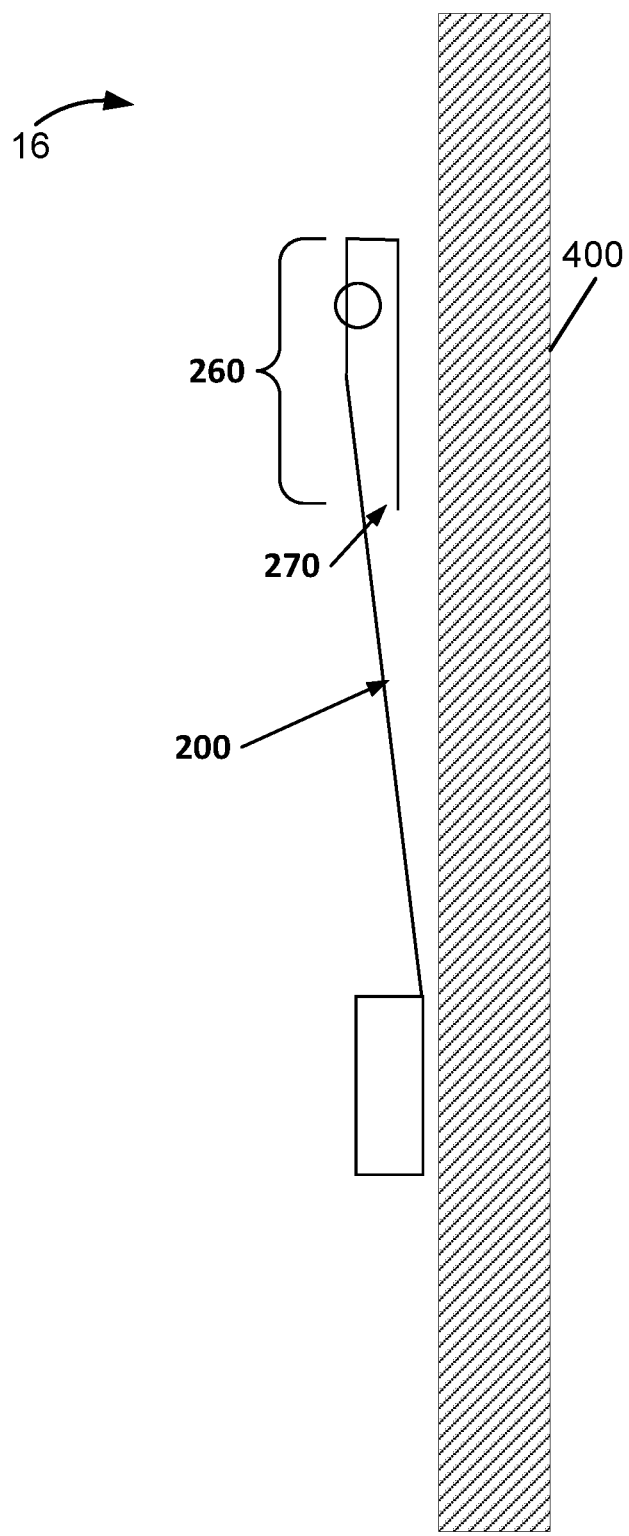
FIG. 6 is a side view of the latch assembly with respect to a wall to which the latch assembly may be secured using a post such as the one shown in FIG. 1.

FIG. 6 is a side view of the latch assembly 200 with respect to a wall 400 to which the latch assembly 200 may be secured using a post 101 such as the one shown in FIG. 1.

The latch 200 is made of a material, e.g., sheet metal, that has elastic deformation properties like a spring. The bottom end of the latch 200 has two legs 252, 254 (see FIG. 4) that fasten to the enclosure by means of a screw or rivet through holes 240, 241 and 239. The legs, also referred to as left latch portion 252 and right latch portion 254, are bent to elevate the lower end of the latch 200. The slot 450 in the latch 200 along with the legs 230 allow the latch 200 to flex outward so that the post 120 can slide into position when the enclosure and latch is moved downward onto the post after the post is initially inserted into the lower opening 424. The top end 260 of the latch 200 shown in FIG. 4 is folded as shown in FIG. 6 to create a stop 270 so that the final positioning of the post is fixed and the enclosure comes to a stop as it is slid down on the post. When the head of the post/shaft 101 is inserted in the latch 200 and moved to the stop on the bracket, e.g., by the enclosure and latch being moved downward, which causes the fixed post 101 to move into the upper portion of slot 422, it pulls the latch 200 and the object it is fastened to (e.g., enclosure 300) towards the bracket 100 and the wall 400 that the bracket 100 is fastened to. The latch 200 acts as a spring to pull the enclosure 300 against the bracket 100 and the surface (e.g., wall 400) the bracket 100 is mounted on. When the post 101 passes into the upper portion 420 of the latch keyhole 210, the sides 252, 254 of the latch 200 spring back to their original position. The ledge formed by the top of the flat latch portions/surfaces 431, 432 at the bottom of the larger 420 opening prevents the post/shaft 101 from coming back out, e.g., sliding down into lower opening 424 while flange 122 keeps the post 101 from moving horizontally out of latch opening 420 and away from the wall 400.

When a release tool 500 is inserted through one or more opening in the enclosure 300 and pressure applied, the latch 200 is pushed below the middle level 124 of the post 101 which releases the latch 200 from the post 101 due to the smaller width of the lower level 126 of the post 101.

Figure 10:
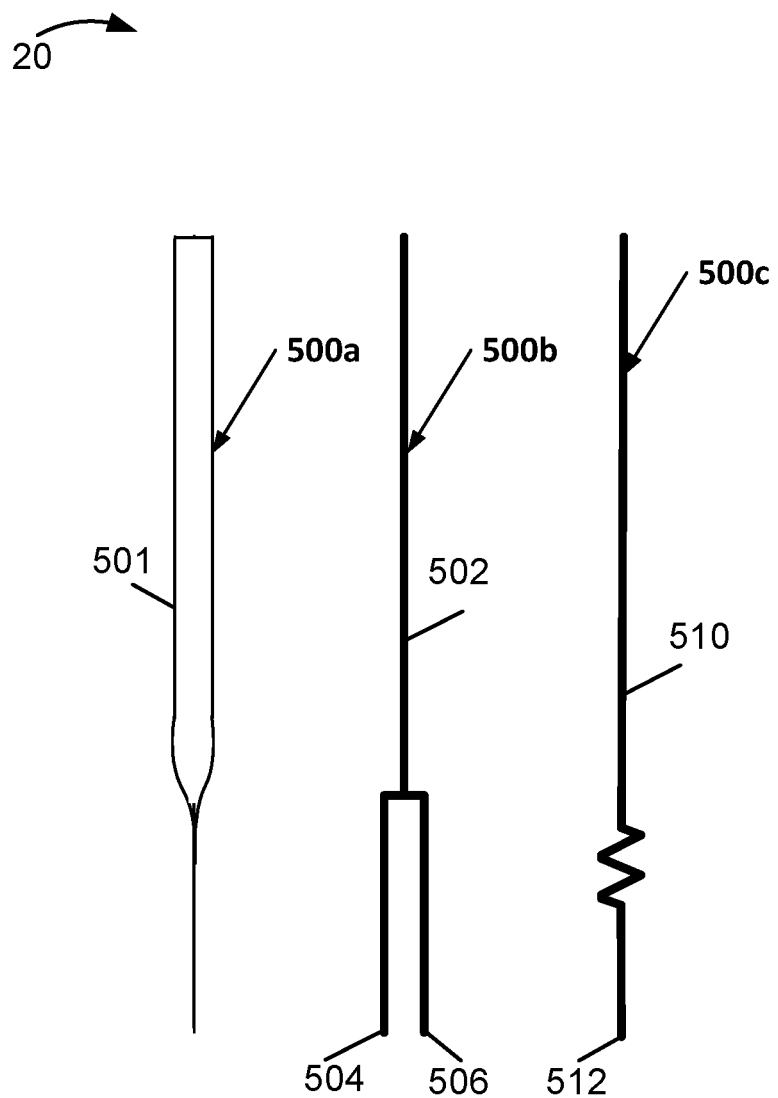
FIG. 10 illustrates various tools which can be used to release the latch with the tool to be used depending, in some cases, on the shape of a front opening on the enclosure which is secured to the wall using the latch.

The latch 200 has the advantage that it pulls the enclosure 300 tight against the bracket 100 and locks it in place once the enclosure is slid into position and keeps it there until pressure is applied by the release tools shown in FIG. 10.

The dimensions of the latch 200 and/or enclosure 300 can vary to meet the needs of the user. For purposes of an example, in one non-limiting exemplary embodiment the width of latch 200 could be 1". The length of the latch 200 after the optional stop 270 has been folded under could be 3". The legs of the latch could be ½". The depth of the recessed back of the enclosure 310 could be ½". The length of the latch keyhole (210+220) could be 1". The U-shaped bend in the latch to create the optional stop 270 could be ¼".

The above dimensions are exemplary and used in at least one embodiment but are not intended to limit all embodiments.

Figure 7:
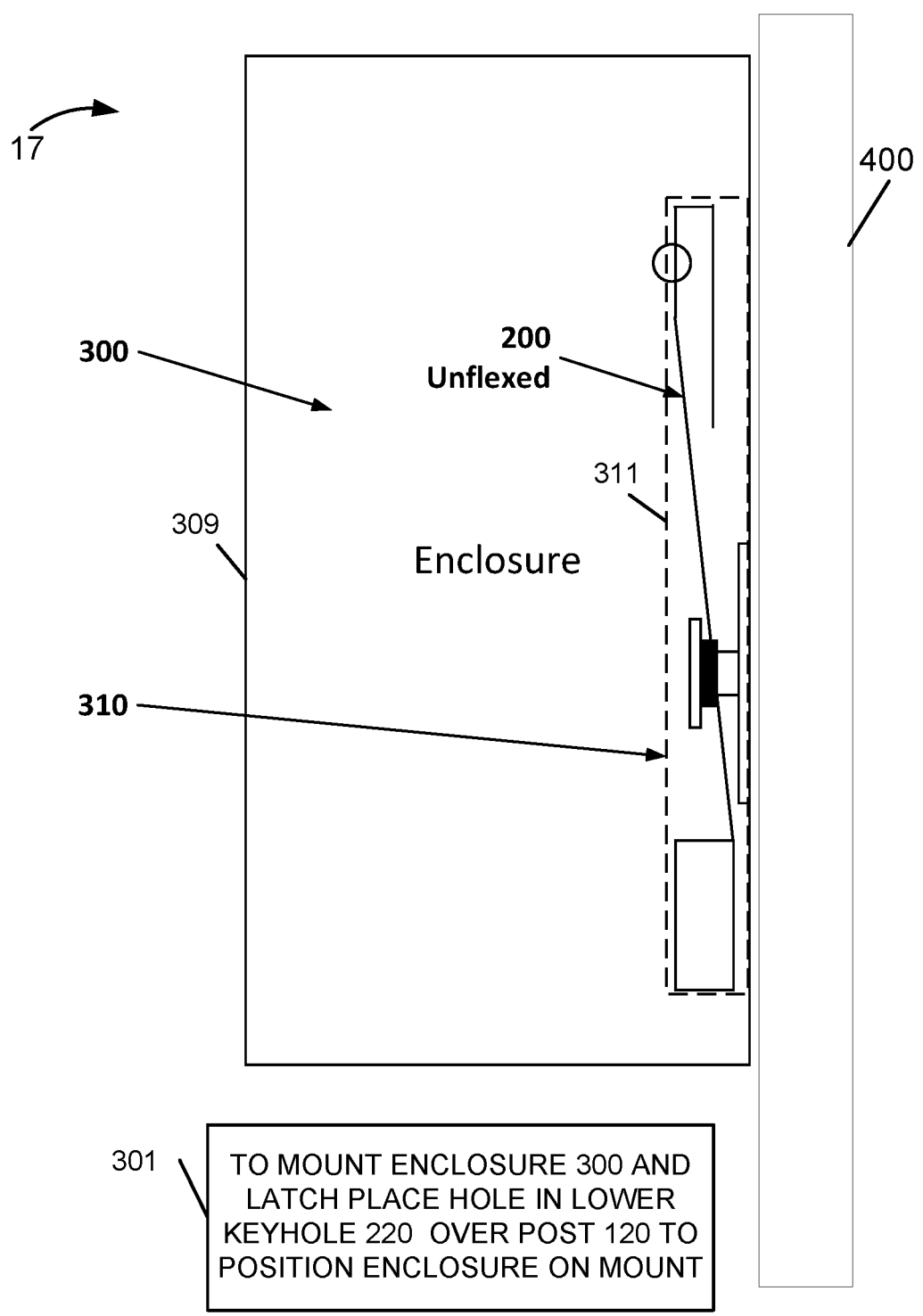
FIG. 7 is a side view showing the latch assembly of FIGS. 5 and 6 in an enclosure with the enclosure and latch being initially inserted over the post of the bracket shown in FIG. 1 after the bracket has been attached to a wall.
Figure 11:
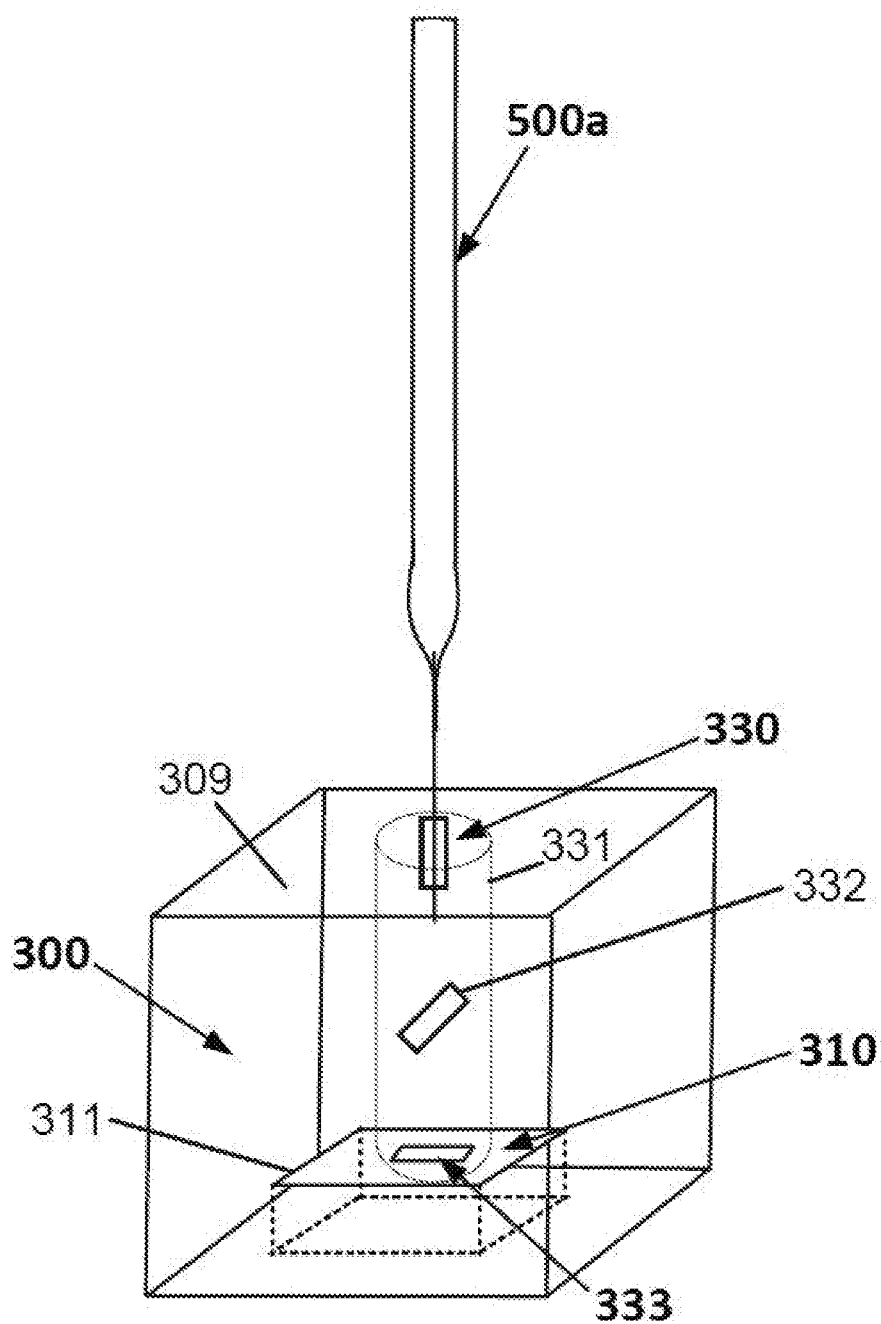
FIG. 11 shows the use of an exemplary twist tool to release the latch in the case where a series of rotated slots is used to reduce the chance of a straight flat item or straight screwdriver being used as a latch release tool instead of the twisted release tool.
Figure 12:
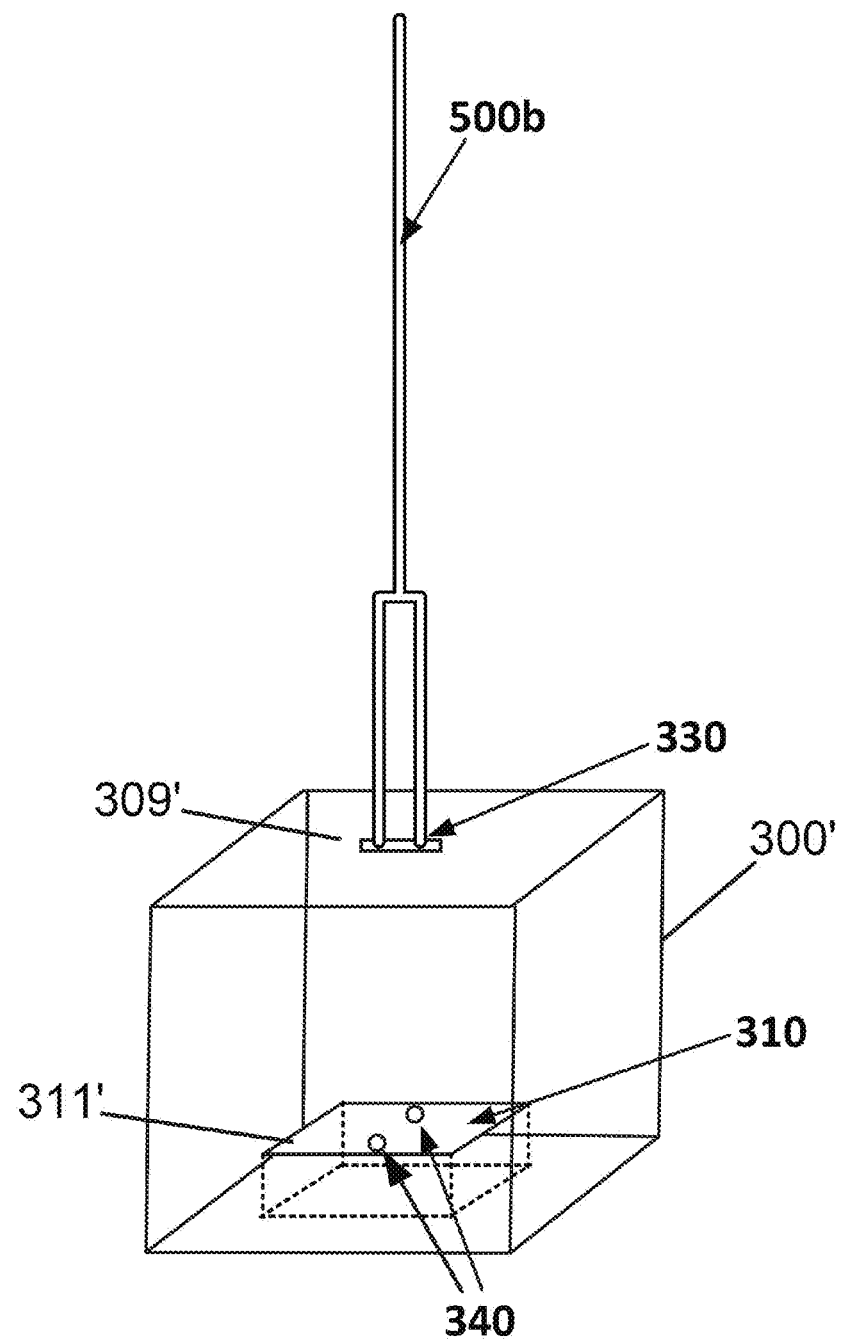
FIG. 12 shows an example in which a fork release tool is used as the latch release tool in one particular exemplary embodiment where the rear of the enclosure includes a pair of offset holes, which can optionally be counter sunk to aid in guiding insertions of the tips of a release tool, through which the tines of the release tool can extend to assert pressure on the latch and thereby release the latch and enclosure from the bracket.

FIG. 7 is a side view 17 showing the latch assembly of FIGS. 5 and 6 in an enclosure 300 with the enclosure 300 and latch 200 being initially inserted over the post 101 of the bracket 100 shown in FIG. 1 after the bracket has been attached to a wall 400. The front wall 309 of the enclosure 300 includes a first slot 330 in some embodiments with the back wall 311 of the enclosure 300 including a second slot 333 or holes 340. As shown in FIGS. 11 and 12. The slots and/or holes allow the release tool to penetrate the walls 309, 311 of the enclosure 300 and apply pressure to the upper portion 201 of the latch 200. Box 301 which includes a mounting step explains that to mount the enclosure 300 and latch 200 an installer places the hole in the lower keyhole 220 of the latch over post 101 to initially position the enclosure on the post 101.

Figure 8:
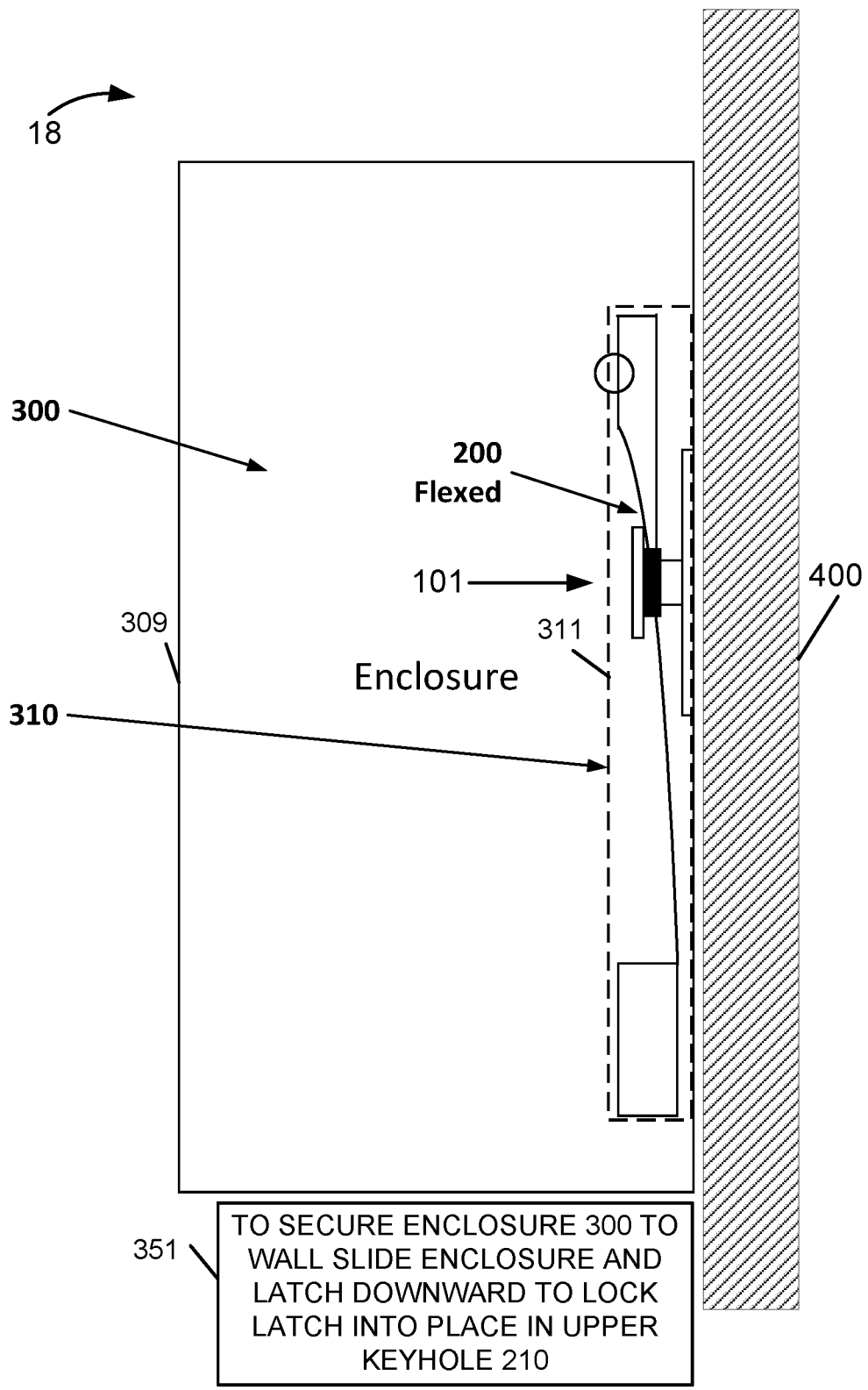
FIG. 8 is a side view showing the latch assembly of FIGS. 5, 6 and 7 in the enclosure with the enclosure and latch having been slid downward along the wall from the position shown in FIG. 7 to a locked position that is shown in FIG. 8.

FIG. 8 is a side view showing the latch assembly of FIGS. 5, 6 and 7 in the enclosure with the enclosure and latch having been slid downward along the wall from the position shown in FIG. 7 to a locked position that is shown in FIG. 8. Note that flange 122 applies pressure to the front side of latch 200 causing the latch 200 to flex and push the latch and enclosure towards the wall 400 where it is locked in place until released using a latch release tool. Box 351 which includes a securing step explains that to secure the enclosure 300 to the wall an installer should slide the enclosure and latch downward to lock the latch 200 into place by moving the assembly so that the post 101 is positioned in the upper opening 210 of the keyhole shaped latch opening 422. It should be appreciated that step 351 would follow step 301 of the installation process.

Figure 9:
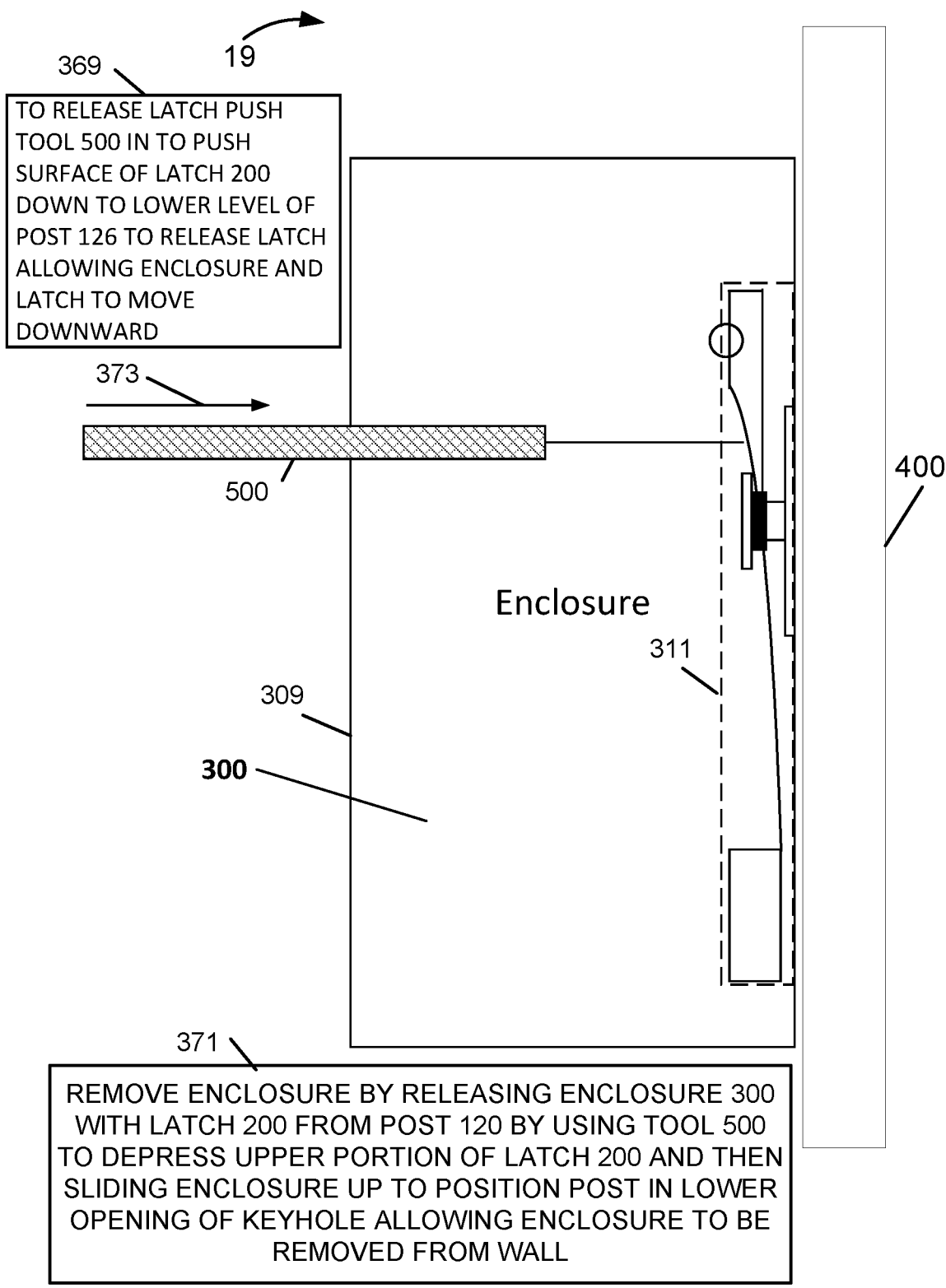
FIG. 9 shows how a release tool of the type shown in FIG. 10 can be inserted into the enclosure and used to compress and release the latch to thereby release the enclosure and allow it to be slid and removed from the wall.

FIG. 9 shows how an exemplary release tool 500, which can be any of the release tools 500a, 500b or 500c of the type shown in FIG. 10 can be inserted into the enclosure and used to compress and release the latch to thereby release the enclosure and allow it to be slid and removed from the wall. Release step 369 explains that to release latch 200 a user is to push release tool 500, while rotating as necessary to reach latch 200 until the surface of the latch 200 is pushed down to the lower level corresponding to portion 126, of post 101, to release the latch and thereby allow the enclosure and latch to move in slot 422. Block 371 shows that removal of the enclosure includes releasing the latch as described in step 369 and then sliding the enclosure and latch 200 to position the post 101 in the lower opening 424 of keyhole 422 and then lifting the enclosure out from the wall.

FIG. 10 illustrates various release tools 500a, 500b and 500c which can be used to release the latch 200. Tool 500a includes flat surfaces 501 and 505 which are twisted with respect to one another requiring twisting or rotation of the tool 500 as it is inserted into one or more slots of the enclosure 300 before coming into contact with latch 200. Tool 500b shows an embodiment in which the release tool is shaped like a fork which can be inserted into a slot on the enclosure 300 before the fork ends 504, 506 come into contact with the latch 200. Tool 500c shows an embodiment having one or more spirals which require rotation of the tool 500c as it is inserted into enclosure 300 to come into contact with latch 200.

The release tool 500a, 500b or 500c to be used depends, in some cases, on the shape of a front opening on the enclosure which is secured to the wall using the latch 200 and/or the shape and position of the slot or holes in the back wall 311 of the enclosure 300 in which the latch 200 is mounted.

FIG. 11 shows the use of an exemplary twist tool 500a to release the latch 200 in the case where a series 330, 332 and 310 of rotated slots is used to reduce the chance of a straight flat item or straight screwdriver being used as a latch release tool instead of the twisted release tool. Slot 332 may be and sometimes is in a plate mounted in a hollow cylinder or tube 331 which extends between the front wall 309 and rear wall 311 of the enclosure 300.

FIG. 12 shows an example in which a fork release tool 500b is used as the latch release tool in one particular exemplary embodiment where the rear wall 311 of the enclosure 300 includes a pair of offset holes 340 through which the tines 504, 506 of the release tool can extend to assert pressure on the latch 200 and thereby release the latch 200 and enclosure 300 from the bracket 100.

In various embodiments the system includes various features which will now be discussed further even though many of features have already been discussed with respect to the figures and exemplary embodiments.

In some embodiments the latch 200 is fastened to an object e.g., an enclosure 300. When the latch 200 is attached to the bracket 100, it securely holds the object in place. The latch 200 also has a release mechanism to allow for easy removal from the bracket 100 when pressure is applied using a release tool.

Figure 13:
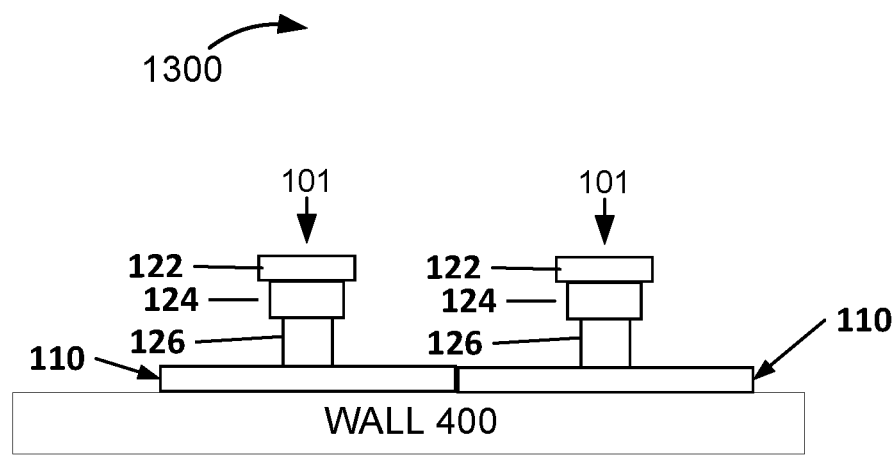
FIG. 13 shows a multi-post embodiment which can be used with an enclosure on which multiple latches of the type shown in any of the other figures in this application are mounted at a spacing corresponding to the spacing of the posts shown in FIG. 13.

While shown as having one post 101 in some embodiments the bracket 200 includes multiple posts secured to the same plate 110 in some embodiments. FIG. 13 shows a multi-post embodiment which can be used with an enclosure on which multiple latches of the type shown in any of the other figures in this application are mounted at a spacing corresponding to the spacing of the posts shown in FIG. 13. Both posts can be secured to the single plate 110 or two separate plates 110 can be used with each plate supporting one post and securing it to the wall 400.

Thus, depending on the particular embodiment, bracket 200 has one or more posts 101 with a head or plate 122 which extends beyond the other area of the post which connect the head to the plate 110. Preferably two posts 101 are used in some embodiments to prevent the object being mounted (e.g., enclosure 300) from rotating. In such a case separate latches 200 are secured to the object 300 to be mounted with there being one latch for each post 101 being used. Thus in a two post embodiment two latches 200 would be secured to the object to be mounted. The bracket 100 is permanently fastened to a surface (e.g., a wall 400) using screws or other fasteners, such as rivets, in various embodiments.

As in the other embodiments, the shaft or shafts 101 have multi-levels, e.g., portions with different size cross sections, that hold the latch 200, lock the latch 200, and release the latch 200 taking advantage of the shape of the openings 420, 424 which form a keyhole shaped opening 422 and the ability for the latch to be pressed and deform given is shape and that it is made of a material than can act as a spring.

In various figures the enclosure 300 is shown with a latch 200 attached to it. The post 120 on the bracket 100 is engaged into the latch 200 when the enclosure is mounted to the wall 400. The bracket 100 is fastened to a surface (e.g., wall 400). The result is that the enclosure 300 is securely pulled to the surface (e.g., wall 400) by the latch 200.

In some embodiments the release tool 500 is a flat piece of metal with a twist in it such as in the 500a embodiment. It passes through one or more narrow slots 330, 332 and 332 in the enclosure 300 positioned in front of the latch 200. In some embodiment the tool 500a is angled so that the flat piece of metal only engages with the latch 200 with the correct twist. The narrow slots prevent an ordinary flat screw driver, e.g., with a flat head and round shaft, from being used as a release tool while the twist prevents a flat piece of metal from being used. Openings with different shapes can be used in other embodiments.

As shown in FIG. 11, the enclosure can and sometime does have a narrow slot 330 with orientation A on the front side of the enclosure 300 and another narrow slot 333 on the recessed back panel or wall 310 of enclosure 300 in orientation B which is different from orientation A. This prevents a plain screw driver or flat piece of metal from releasing the latch 200 from the post 120.

To make it even more difficult to release without a release tool having a configuration which is the same or similar to the tool 500c shown in FIG. 10, a bar or cylinder 331 (see FIG. 11) with a molded spiral hole (cork screw like) extending from the front of enclosure 300 to the recessed back panel 310 of the enclosure can be constructed and used as shown in the Embodiment of FIG. 11. In such an embodiment, the release tool 500c would be a twisted rod with twists that match the twisted molded spiral hole in the bar or cylinder 331. To release the latch in such an embodiment the user would rotate tool 500c through the spiral bar or cylinder 311 and then it can be used to press latch 200 to release it.

Another way the release tool can be constructed would be in the shape of a fork. Tool 500b shown in FIG. 10 represents one such embodiment. FIG. 12 shows an exemplary embodiment in which a fork shaped release tool is used. To release the latch 200 in such an embodiment, the fork gets inserted into the slot 330, then the fork is rotated to align with two holes 340 in the recessed back of enclosure 310. The holes 340 can be, and sometimes are, cone shaped or otherwise tapered to help guide the tines 504, 506 of the 500b fork into position to release the latch 200 attached to the recessed back of enclosure 310. Thus it should be approached that the holes 340 can optionally be counter sunk to aid in guiding insertions of the tips of a release tool.

Regardless of the particular shape of the release tool, the release tool is used to press into the latch 200 so that the latch 200 is pushed below the middle level 124 of the shaft 101. This releases the latch 200 from the shaft/post 101 and the enclosure 300 can be removed.

The release tool can and sometimes does have a partial twist or multiple twists, and the twists can vary in pitch as long as the enclosure 300 has a matching channel for the tool 500 to fit through and reach the latch 200.

The tool 500 is simple and inexpensive to implement yet prevents unauthorized releasing of the latch.

Various exemplary embodiments have been discussed with regard to the figures. An exemplary list of numbered embodiments is set forth below. The list in not intended to be limiting and it should be appreciated that the list may not include or cover all the features of the various exemplary embodiments discussed above.

Numbered List of Exemplary Embodiments:

Embodiment 1. An assembly of components comprising: a mounting bracket (100) including: a mounting plate (110); a shaft (101) including: i) a first shaft portion (126) secured to the mounting plate (110) and having a first cross-sectional area, ii) a second shaft portion (124) having a second cross-sectional area which is larger than said first cross-sectional area and iii) a flange (122) on the end of said shaft (101); and a mounting latch (200) including an elongated opening (422), the elongated opening (422) including and first opening (420) and a tapered second opening (424), the tapered second opening (424) tapering down in width from a maximum second opening width to a smaller second opening width (e.g., a minimum second opening width) at a location (425) where the tapered second opening (424) joins the first opening (420).

Embodiment 2. The assembly of components of Numbered Embodiment 1, wherein the first opening (420) includes a flat left (431) and flat right (432) surface edges for contacting and supporting the second portion (124) of the shaft when the shaft (101) is positioned in the first opening (420).

Embodiment 3. The assembly of components of Numbered Embodiment 2, wherein said mounting latch (200) further includes a slit (450) separating a left side (252) of the mounting latch (200) from a right side (254) of the mounting latch (200).

Embodiment 4. The assembly of components of Numbered Embodiment 3, wherein said mounting latch (200) is formed from sheet metal, said left (252) and right (254) sides of said mounting latch (200) flexing when the shaft (101) is changed from being positioned in the tapered second opening (424) to being positioned in the first opening (420).

Embodiment 5. The assembly of components of Numbered Embodiment 4, wherein second shaft portion (124) is triangular shaped with a point facing toward said first opening (420), said point separating left and right sides (252, 254) of said mounting latch (200) when the shaft (101) is slid through the tapered second opening (424) into the first opening (420).

Embodiment 6. The assembly of components of Numbered Embodiment 2, further comprising: an enclosure (300) including a recessed back enclosure area (310) defined by a rear enclosure wall (311), said mounting latch (200) being secured to the rear enclosure wall (311) and being contained in the recessed back enclosure area (310).

Embodiment 7. The assembly of components of Numbered Embodiment 6, wherein the enclosure (300) further includes a front enclosure wall (309) including a first slot (330) or other opening through which a latch release tool can be inserted into the enclosure (300).

Embodiment 8. The assembly of components of Numbered Embodiment 7, wherein the rear enclosure wall (311) further includes a second slot (333) through which a portion of the latch release tool can pass to allow the latch release tool to contact and apply pressure to a portion of the mounting latch (200).

Embodiment 9. The assembly of components of Numbered Embodiment 8, wherein said portion of the mounting latch (200) is an first portion (201) of the mounting latch (200), said first portion (201) being positioned above the first opening (420), pressure applied to the first portion (201) of the mounting latch (200) moving the first portion (200) backward and allowing the enclosure (300) to be moved so that the shaft (101) is positioned in the second opening (424) allowing the enclosure (300) including the mounting latch (200) to be lifted off the mounting bracket (100).

Embodiment 10. The assembly of components of Numbered Embodiment 2, further comprising: a pin (111) extending from said mounting plate (110).

Embodiment 11. The assembly of components of Numbered Embodiment 10, wherein said pin (111) is aligned to fit into a slot (450) which joins said elongated opening (422).

Embodiment 12. The assembly of components of Numbered Embodiment 9, the system further comprising: a latch release tool (500a or 500b), the latch release tool including i) a twisted tool shaft (501) or ii) a combination of a tool shaft (502 or 510) and at least one drive tip (504, 506 or 512) offset from the tool shaft (502 or 510).

Embodiment 13. The assembly of components of Numbered Embodiment 12, wherein the latch release tool (500b) is fork shaped and includes two tips (504, 506).

Embodiment 14. The assembly of components of Numbered Embodiment 13, wherein the latch release tool (500c) has a flat shaft (501) which spirals as it extends from a handle end to a tip end.

Embodiment 15. The assembly of components of Numbered Embodiment 10, wherein the assembly of components includes multiple shafts (101) spaced apart from one another.

Embodiment 16. The assembly of components of Numbered Embodiment 15, wherein the assembly of components further includes a plurality of mounting latches (200), the number of mounting latches (200) equaling the number of shafts (101).

Embodiment 17. The assembly of components of claim Numbered Embodiment 2, further comprising: an enclosure (300) including a rear surface to which said mounting latch (200) is attached; wherein the mounting plate (110) and the shaft (101) are secured to a wall (400); and wherein the enclosure (300) is forced towards the wall (400) by latch spring tension as the enclosure (300) and mounting latch (200) are slid over the post (101) moving the mounting latch (200) from an unlocked position to a locked position.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. An assembly of components comprising:
   a mounting bracket including:
      a mounting plate; and
      a shaft including: i) a first shaft portion secured to the mounting plate and having a first cross-sectional area, ii) a second shaft portion having a second cross-sectional area which is larger than said first cross-sectional area and iii) a flange on the end of said shaft; and
   a mounting latch including an elongated opening, the elongated opening including a first opening and a tapered second opening, the tapered second opening tapering down in width from a maximum second opening width to a smaller second opening width at a location where the tapered second opening joins the first opening;
   wherein the first opening includes flat left and flat right surface edges for contacting and supporting the second portion of the shaft when the shaft is positioned in the first opening; and
   wherein said mounting latch further includes a slit separating a left side of the mounting latch from a right side of the mounting latch.

2. The assembly of components of claim 1, wherein said mounting latch is formed from sheet metal, said left and right sides of said mounting latch flexing when the shaft is changed from being positioned in the tapered second opening to being positioned in the first opening.

3. The assembly of components of claim 2, wherein said second shaft portion is triangular shaped with a point facing toward said first opening, said point separating left and right sides of said mounting latch when the shaft is slid through the tapered second opening into the first opening.

4. The assembly of components of claim 1, further comprising:
   a pin extending from said mounting plate.

5. An assembly of components comprising:
   a mounting bracket including:
      a mounting plate; and
      a shaft including: i) a first shaft portion secured to the mounting plate and having a first cross-sectional area, ii) a second shaft portion having a second cross-sectional area which is larger than said first cross-sectional area and iii) a flange on the end of said shaft;
   a mounting latch including an elongated opening, the elongated opening including a first opening and a tapered second opening, the tapered second opening tapering down in width from a maximum second opening width to a smaller second opening width at a location where the tapered second opening joins the first opening, wherein the first opening includes flat left and flat right surface edges for contacting and supporting the second portion of the shaft when the shaft is positioned in the first opening; and
   an enclosure including a recessed back enclosure area defined by a rear enclosure wall, said mounting latch being secured to the rear enclosure wall and being contained in the recessed back enclosure area.

6. The assembly of components of claim 5, wherein the enclosure further includes a front enclosure wall including a first slot or other opening through which a latch release tool can be inserted into the enclosure.

7. The assembly of components of claim 6, wherein the rear enclosure wall further includes a second slot through which a portion of the latch release tool can pass to allow the latch release tool to contact and apply pressure to a portion of the mounting latch.

8. The assembly of components of claim 7, wherein said portion of the mounting latch is a first portion of the mounting latch, said first portion being positioned above the first opening, pressure applied to the first portion of the mounting latch moving the first portion backward and allowing the enclosure to be moved so that the shaft is positioned in the second opening allowing the enclosure including the mounting latch to be lifted off the mounting bracket.

9. The assembly of components of claim 8, further comprising:
   said latch release tool, the latch release tool including i) a twisted tool shaft or ii) a combination of a tool shaft and at least one drive tip offset from the tool shaft.

10. The assembly of components of claim 9, wherein the latch release tool is fork shaped and includes two tips.

11. The assembly of components of claim 9, wherein the latch release tool has a flat shaft which spirals as it extends form a handle end to a tip end.

12. An assembly of components comprising:
   a mounting bracket including:
      a mounting plate; and
      a shaft including: i) a first shaft portion secured to the mounting plate and having a first cross-sectional area, ii) a second shaft portion having a second cross-sectional area which is larger than said first cross-sectional area and iii) a flange on the end of said shaft; and
   a mounting latch including an elongated opening, the elongated opening including a first opening and a tapered second opening, the tapered second opening tapering down in width from a maximum second opening width to a smaller second opening width at a location where the tapered second opening joins the first opening, wherein the first opening includes flat left and flat right surface edges for contacting and supporting the second portion of the shaft when the shaft is positioned in the first opening; and
   a pin extending from said mounting plate, wherein said pin is aligned to fit into a slot which joins said elongated opening.

13. An assembly of components comprising:
   a mounting bracket including:
      a mounting plate; and
      a shaft including: i) a first shaft portion secured to the mounting plate and having a first cross-sectional area, ii) a second shaft portion having a second cross-sectional area which is larger than said first cross-sectional area and iii) a flange on the end of said shaft; and
   a mounting latch including an elongated opening, the elongated opening including a first opening and a tapered second opening, the tapered second opening tapering down in width from a maximum second opening width to a smaller second opening width at a location where the tapered second opening joins the first opening, wherein the first opening includes flat left and flat right surface edges for contacting and supporting the second portion of the shaft when the shaft is positioned in the first opening; and
   a pin extending from said mounting plate; and
   wherein the assembly of components includes multiple shafts spaced apart from one another.

14. The assembly of components of claim 13, wherein the assembly of components further includes a plurality of mounting latches, the number of mounting latches equaling the number of shafts.

15. An assembly of components comprising:
   a mounting bracket including:
      a mounting plate; and
      a shaft including: i) a first shaft portion secured to the mounting plate and having a first cross-sectional area, ii) a second shaft portion having a second cross-sectional area which is larger than said first cross-sectional area and iii) a flange on the end of said shaft;
   a mounting latch including an elongated opening, the elongated opening including a first opening and a tapered second opening, the tapered second opening tapering down in width from a maximum second opening width to a smaller second opening width at a location where the tapered second opening joins the first opening, wherein the first opening includes flat left and flat right surface edges for contacting and supporting the second portion of the shaft when the shaft is positioned in the first opening; and
   an enclosure including a rear surface to which said mounting latch is attached;

wherein the mounting plate and the shaft are secured to a wall;

wherein the mounting latch acts as a spring; and wherein the enclosure is forced towards the wall by latch spring tension of the mounting latch as the enclosure and mounting latch are slid over the shaft moving the mounting latch from an unlocked position to a locked position.

\* \* \* \* \*